United States Patent
Yu et al.

(10) Patent No.: US 10,728,223 B2
(45) Date of Patent: Jul. 28, 2020

(54) WI-FI CONNECTION METHOD, MOBILE TERMINAL AND STORAGE MEDIUM

(71) Applicant: GUANGDONG OPPO MOBILE TELECOMMUNICATIONS CORP., LTD., Dongguan, Guangdong (CN)

(72) Inventors: Yi Yu, Dongguan (CN); Botao Cu, Dongguan (CN); Yadong Hu, Dongguan (CN); Shimin Jiang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 144 days.

(21) Appl. No.: 15/793,323

(22) Filed: Oct. 25, 2017

(65) Prior Publication Data

US 2018/0241724 A1 Aug. 23, 2018

(30) Foreign Application Priority Data

Feb. 20, 2017 (CN) .......................... 2017 1 0090716

(51) Int. Cl.
*H04L 29/06* (2006.01)
*H04W 48/16* (2009.01)
(Continued)

(52) U.S. Cl.
CPC ........ *H04L 63/0428* (2013.01); *H04L 63/061* (2013.01); *H04L 63/08* (2013.01);
(Continued)

(58) Field of Classification Search
CPC ... H04L 63/0428; H04L 63/061; H04L 63/08; H04L 9/0894; H04W 76/10;
(Continued)

(56) References Cited

U.S. PATENT DOCUMENTS

2004/0110530 A1 6/2004 Alone
2006/0135068 A1 6/2006 Jaakkola
(Continued)

FOREIGN PATENT DOCUMENTS

CN 1485751 A 3/2004
CN 101112048 A 1/2008
(Continued)

OTHER PUBLICATIONS

International Search Report in international application No. PCT/CN2017/104766, dated Jan. 4, 2018.
(Continued)

*Primary Examiner* — Eleni A Shiferaw
*Assistant Examiner* — Bassam A Noaman (57) ABSTRACT

A Wireless Fidelity (WI-FI) connection method and a mobile terminal for efficiently connecting to hidden access points. X parameters of a target Access Point (AP) are acquired, the X parameters at least includes the target SSID of the target AP, where X is a positive integer. WI-FI scanning is performed according to the X parameters. When the target AP is not found by the scanning, encryption schemes of one or more hidden APs are acquired to get the H encryption schemes, where H is a positive integer. WI-FI scanning is performed according to the target SSID and at least one of the H encryption schemes.

16 Claims, 5 Drawing Sheets

(51) Int. Cl.
*H04W 12/02* (2009.01)
*H04W 76/10* (2018.01)
*H04W 8/00* (2009.01)
*H04L 9/08* (2006.01)
*H04W 12/08* (2009.01)
*H04W 12/04* (2009.01)
*H04W 84/12* (2009.01)

(52) U.S. Cl.
CPC ........... *H04W 8/005* (2013.01); *H04W 12/02* (2013.01); *H04W 12/04* (2013.01); *H04W 48/16* (2013.01); *H04W 76/10* (2018.02); *H04L 9/0894* (2013.01); *H04W 12/08* (2013.01); *H04W 84/12* (2013.01)

(58) Field of Classification Search
CPC ..... H04W 8/005; H04W 12/02; H04W 12/04; H04W 48/16; H04W 12/08; H04W 84/12
See application file for complete search history.

(56) References Cited

U.S. PATENT DOCUMENTS

| | | | |
|---|---|---|---|
| 2008/0082543 | A1 | 4/2008 | Abhishek |
| 2008/0130595 | A1 | 6/2008 | Abdel-Kader |
| 2008/0198811 | A1 | 8/2008 | Deshpande et al. |
| 2010/0309815 | A1 | 12/2010 | Yepez |
| 2011/0088078 | A1* | 4/2011 | Kholaif ................. H04W 12/06 726/3 |
| 2014/0128102 | A1* | 5/2014 | Finlow-Bates ....... H04W 48/08 455/456.3 |
| 2015/0188940 | A1* | 7/2015 | Lapidous .............. H04W 12/12 726/15 |
| 2015/0289225 | A1* | 10/2015 | Gao ..................... H04W 64/003 455/456.5 |
| 2016/0337945 | A1 | 11/2016 | Watt et al. |

FOREIGN PATENT DOCUMENTS

| | | |
|---|---|---|
| CN | 101202686 A | 6/2008 |
| CN | 103686674 A | 3/2014 |
| CN | 105657695 A | 6/2016 |
| CN | 105900379 A | 8/2016 |
| CN | 106686587 A | 5/2017 |
| CN | 106804055 A | 6/2017 |
| WO | 2006067595 A1 | 6/2006 |

OTHER PUBLICATIONS

English Translation of the Written Opinion of the International Search Authority in international application No. PCT/CN2017/104766, dated Jan. 4, 2018.

Supplementary European Search Report in European application No. 17193566.1, dated Jan. 12, 2018.

First Office Action of the Indian application No. 201714042161, dated Feb. 13, 2020.

* cited by examiner

WI-FI CONNECTION METHOD, MOBILE TERMINAL AND STORAGE MEDIUM

CROSS-REFERENCE TO RELATED APPLICATIONS

This application claims priority to Chinese Patent Application No. 201710090716.9 filed on Feb. 20, 2017, the disclosure of which is incorporated by reference herein in its entirety.

TECHNICAL FIELD

The disclosure relates to the technical field of communications, and in particular to a Wireless Fidelity (WI-FI) connection method and a mobile terminal.

BACKGROUND

Along with rapid development of the information technology, use of mobile terminals (such as mobile phone and tablet computer) becomes increasingly popular. Users have higher requirements on the mobile terminals. They not only require the mobile terminal to have a relatively high processing speed, but also increasingly rely upon WI-FI connection. Along with popularization of the mobile terminals and the WI-FI, the event of accessing a WI-FI network through a mobile terminal occurs more and more frequently.

SUMMARY

A first aspect of the embodiments of the disclosure provides a WI-FI connection method, which includes: the X parameters of the target AP are acquired, the X parameters at least including the target SSID of the target AP, where X is a positive integer; WI-FI scanning is performed according to the X parameters; when the target AP is not found by the scanning, encryption schemes of one or more hidden APs are acquired to get the H encryption schemes, where H is a positive integer; and WI-FI scanning is performed according to the target SSID and at least one of the H encryption schemes.

A second aspect of the embodiments of the disclosure provides a mobile terminal, which includes: a processor and a memory, wherein the processor calls a code or instruction in the memory to execute the method described in the first aspect.

A third aspect of the embodiments of the disclosure provides a non-transitory computer readable storage medium, storing instructions, which, when executed by a processor, cause the processor to execute the method described in the first aspect.

BRIEF DESCRIPTION OF DRAWINGS

In order to describe the technical solutions in the embodiments of the disclosure more clearly, the drawings required to be used for descriptions about the embodiments will be simply introduced below. Of course, the drawings described below are some embodiments of the disclosure. Those skilled in the art may further obtain other drawings according to these drawings without creative work.

DETAILED DESCRIPTION

The technical solutions in the embodiments of the disclosure will be clearly and completely described below in connection with the drawings in the embodiments of the disclosure. Of course, the described embodiments are not all embodiments but part of embodiments of the disclosure. All other embodiments obtained on the basis of the embodiments in the disclosure by those skilled in the art without creative work shall fall within the scope of protection of the invention.

Terms "first", "second", "third", "fourth" and the like in the specification, claims and drawings of the disclosure are intended not to describe a specific sequence but only to distinguish different objects. In addition, terms "include" and "have" and any transformation thereof are intended to cover nonexclusive inclusions. For example, a process, method, system, product or equipment including a series of operations or units is not limited to the listed operations or units, but may further include operations or units which are not listed, or may further include other operations or units intrinsic to the process, the method, the product or the equipment.

"Embodiment" mentioned in the disclosure means that specific characteristics, structures or properties described in connection with an embodiment may be included in at least one embodiment of the disclosure. This word displayed at each position in the specification does not refer to the same embodiment as well as an independent or alternate embodiment mutually exclusive to other embodiments. It may be explicitly and implicitly understood by those skilled in the art that the embodiments described in the disclosure may be combined with the other embodiments.

A mobile terminal described in the embodiments of the disclosure may include a smart phone (such as an Android phone, an iOS phone and a Windows phone), a tablet computer, a palmtop computer, a notebook computer, a Mobile Internet Device (MID), wearable equipment or the like, which are not exhausted by only listed as examples, and includes, but not limited to, the listed mobile terminals.

Normally, in order to enable a mobile terminal to access a hidden Access Point (AP), all of the Service Set Identifier (SSID), the encryption scheme and the password of the AP provided by the mobile terminal shall be correct. In practice, if a wrong encryption scheme is input or no encryption scheme is input, a hidden AP which a user desires to access cannot be found out. Therefore, WI-FI connection efficiency is very low.

It is to be noted that a target AP in the embodiments of the disclosure may be an AP specified by a user. Under the condition that an AP is a hidden AP, the user may input information such as an SSID, encryption scheme and password of the AP. When only the SSID of the AP is input, WI-FI scanning may be performed according to the SSID to search for an AP with the same SSID as the AP. When only the SSID and encryption scheme of the AP are input, WI-FI scanning may be performed according to the SSID and the encryption scheme to search for an AP with the same SSID and encryption scheme as the AP. When the SSID, encryption scheme and password of the AP are input, WI-FI scanning may be performed according to the SSID, the encryption scheme and the password to search for an AP with the same SSID, encryption scheme and password as the AP.

It is to be noted that historical WI-FI connection data in the embodiments of the disclosure may include multiple WI-FI connection records, and each WI-FI connection record may include an AP which has ever been successfully accessed. Of course, each WI-FI connection record may also include attribute information of the AP which has ever been successfully accessed and network environment information (such as a position of a mobile terminal, signal strength and the like of surrounding APs and attribute information of the surrounding APs), and the attribute information may include at least one of: an SSID, a Basic SSID (BSSID), an encryption scheme, a password, whether it is hidden or not (hidden or non-hidden) and the like. Of course, every time when the mobile terminal successfully accesses a certain AP, a WI-FI connection record may be generated, and an SSID, BSSID, encryption scheme, password and whether it is hidden or not of the AP and the position of the mobile terminal are recorded. Furthermore, each WI-FI connection record in the embodiment of the disclosure may further include an AP which has ever been tried to be accessed but failed to be accessed. For example, for a certain hidden AP a, the AP may be found when WI-FI scanning is performed according to an SSID of a, the AP cannot be connected because a wrong password of a is input, but a WI-FI connection record may be generated.

In some embodiments of the disclosure, a WI-FI connection method is provided, which includes: the X parameters of the target AP are acquired, the X parameters at least including the target SSID of the target AP, where X is a positive integer; WI-FI scanning is performed according to the X parameters; when the target AP is not found by the scanning, encryption schemes of one or more hidden APs are acquired to get the H encryption schemes, where H is a positive integer; and WI-FI scanning is performed according to the target SSID and at least one of the H encryption schemes.

In some embodiments of the disclosure, a mobile terminal is provided, which includes a processor and a memory, wherein the processor calls a code or instruction in the memory to execute the WI-FI connection method described above.

In some embodiments of the disclosure, a non-transitory computer readable storage medium is provided, the non-transitory computer readable storage medium stores instructions, which, when executed by a processor, cause the processor to execute the WI-FI connection method described above.

Figure 1:
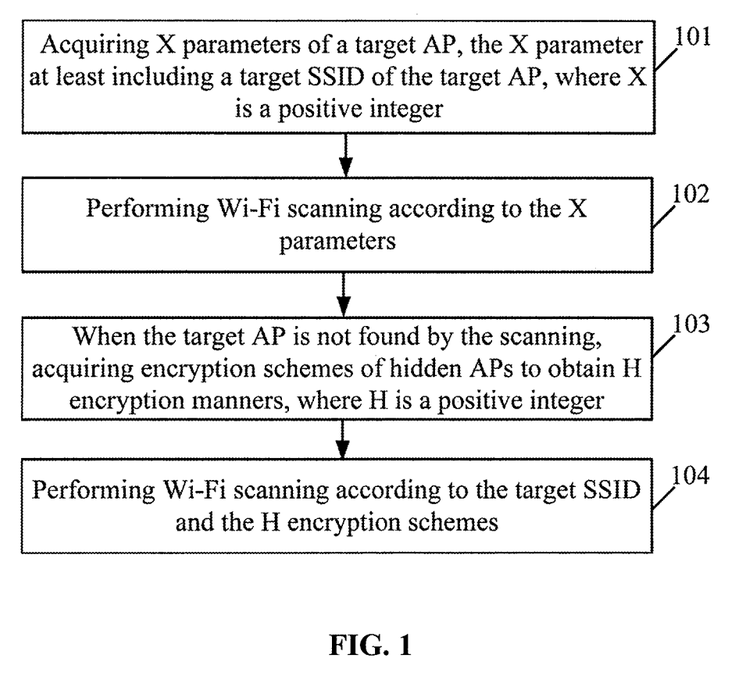
FIG. 1 illustrates a flowchart of a WI-FI connection method according to an embodiment of the disclosure.

FIG. 1 illustrates a flowchart of a WI-FI connection method according to an embodiment of the disclosure. The WI-FI connection method described in the embodiment includes the following operations in blocks illustrated in FIG. 1. The method can begin at block 101.

At block 101, X parameters of a target AP are acquired, the X parameters at least including a target SSID of the target AP, where X is a positive integer.

Here, the parameters of the target AP may include, but not limited to: an SSID, a BSSID, an encryption scheme and a password. X is an integer more than or equal to 1. The X parameters may be input by a user or read from a memory of a mobile terminal (for example, multiple SSIDs are pre-stored in the mobile terminal, and any SSID may be read).

At block 102, WI-FI scanning is performed according to the X parameters.

Here, when performing WI-FI scanning according to the X parameters, the mobile terminal may find the target AP, or of course, may not find the AP. For example, under the condition that a wrong encryption scheme is input, the AP may not be found. Under such a condition, non-hidden APs and other APs with null SSIDs (i.e. hidden APs) may still be found. Specifically, after the WI-FI scanning is performed according to the X parameters, a scanning result may be obtained. The scanning result may include AP information of multiple APs. Of course, the scanning result may not only include AP information of some APs with displayed SSIDs (non-hidden APs) under a normal condition, but also include AP information of some APs with null SSIDs (hidden APs).

At block 103, when the target AP is not found by the scanning, encryption schemes of hidden APs are acquired to get H encryption schemes, where H is a positive integer.

Here, when the mobile terminal does not find the target AP, the encryption schemes of the hidden APs may be acquired in the following three manners.

In a first manner, the encryption schemes of the hidden APs are acquired from historical WI-FI connection data.

Figure 2A:
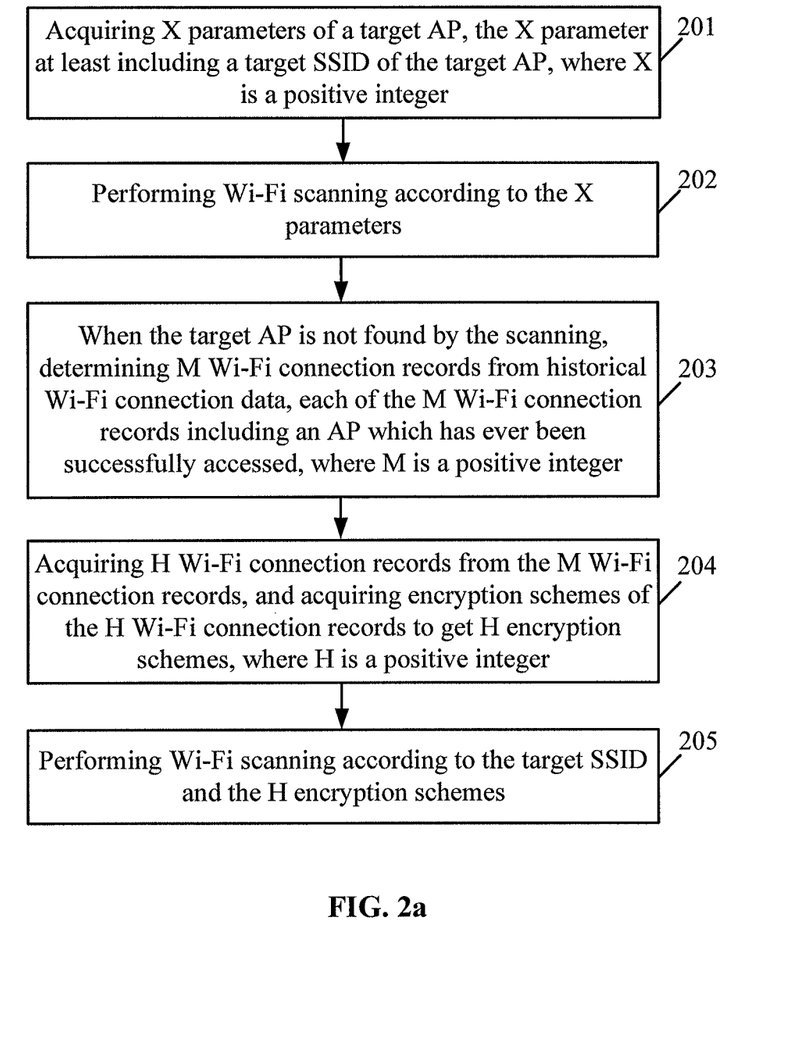
FIG. 2a illustrates a flowchart of a WI-FI connection method according to an embodiment of the disclosure.

Specifically, detailed description of a WI-FI connection method depicted in FIG. 2*a* may be taken as an example.

In a second manner, at least one AP with a null SSID is acquired from the scanning result, and an encryption scheme thereof is acquired.

Here, after the mobile terminal performs WI-FI scanning according to the X parameters, the AP information of the APs with the null SSIDs (the hidden APs) may be obtained from the scanning result. Therefore, encryption schemes of the APs may be acquired.

In a third manner, an AP including the target SSID is acquired from the scanning result, and an encryption scheme thereof is acquired.

Here, the target SSID is a hidden AP, and if the AP consistent with the target SSID is found from the scanning result, it is indicated that the AP is probably the target AP. Therefore, the encryption scheme of the AP may be acquired.

At block 104, WI-FI scanning is performed according to the target SSID and the H encryption schemes.

Here, during each cycle of WI-FI scanning, the mobile terminal selects one encryption scheme from the H encryption schemes for WI-FI scanning according to the SSID. Therefore, the mobile terminal may traverse the H encryption schemes by at most H cycles of WI-FI scanning. Of course, if successfully accessing the target AP in a certain WI-FI scanning process, the mobile terminal stops WI-FI scanning.

According to the embodiment of the disclosure, the X parameters of the target AP are acquired, the X parameters at least including the target SSID of the target AP, where X is a positive integer; WI-FI scanning is performed according to the X parameters; when the target AP is not found by the scanning, the encryption schemes of the hidden APs are acquired to get the H encryption schemes, where H is a positive integer; and WI-FI scanning is performed according to the target SSID and the H encryption schemes. Therefore, the encryption schemes of the hidden APs may be acquired under the condition that a wrong encryption scheme is input, WI-FI scanning is performed according to the target SSID and the encryption schemes of the hidden APs. In this way, connection efficiency of the hidden APs may be improved.

FIG. 2a illustrates a flowchart of a WI-FI connection method according to an embodiment of the disclosure. The WI-FI connection method described in the embodiment includes the following operations illustrated in blocks. The method can begin from block 201.

At block 201, X parameters of a target AP are acquired, the X parameters at least including a target SSID of the target AP, where X is a positive integer.

At block 202, WI-FI scanning is performed according to the X parameters.

At block 203, when the target AP is not found by scanning, M WI-FI connection records are determined from historical WI-FI connection data, each of the M WI-FI connection records including an AP which has ever been successfully accessed, where M is a positive integer.

Figure 2B:
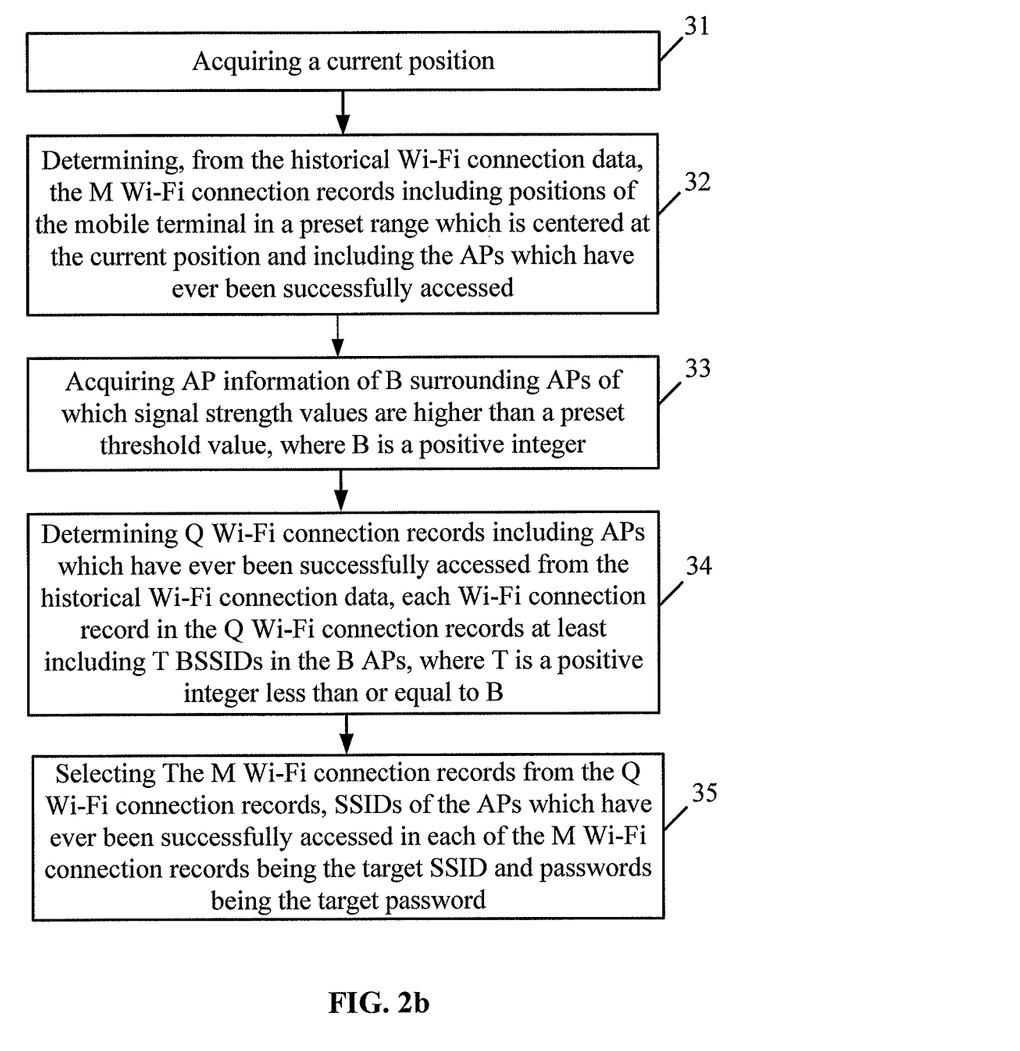
FIG. 2b illustrates a flowchart of operations for determining M WI-FI connection records from historical WI-FI connection data according to an embodiment of the disclosure.

In at least one embodiment, determination of the M WI-FI connection records from the historical WI-FI connection data at block 203 may include the following operations, as illustrated in FIG. 2b.

At operation 31, a current position is acquired.

At operation 32, the M WI-FI connection records including positions of a mobile terminal in a preset range which is centered at the current position and including the APs which have ever been successfully accessed are determined from the historical WI-FI connection data.

Here, the mobile terminal may determine the current position of the mobile terminal through a Global Positioning System (GPS), or, the mobile terminal may determine the current position of the mobile terminal through a WI-FI positioning technology. The current position of the mobile terminal may be represented by a latitude and a longitude. For example, the current position may be represented to be 113° 46' east longitude and 22° 27' north latitude. Of course, if the current position of the mobile terminal is determined by adopting the WI-FI positioning technology, a position of a certain AP obtained by current WI-FI scanning is determined as the position of the mobile terminal, and the position of the AP, if being marked on an indoor map, may be determined as a point (which represents the position of the mobile terminal). Furthermore, the mobile terminal may determine the M WI-FI connection records including the positions of the mobile terminal in the preset range which is centered at the current position and including the APs which have ever been successfully accessed from the historical WI-FI connection data.

For example, every time when a user is intended to access an AP, an SSID, BSSID, encryption scheme and password of the AP and the position of the mobile terminal are recorded to form a WI-FI connection record of the AP, which is stored in a certain file of the mobile terminal. The file may be set to be input-only, and is configured to record information of all APs which have ever been successfully accessed, thereby obtaining the historical WI-FI connection data. The mobile terminal may determine the position of the mobile terminal and search the historical WI-FI connection data for all WI-FI connection records including the APs which have ever been successfully accessed within a preset range (for example, 10 meters) of the position, and may further store AP information in these WI-FI connection records in a list L.

In at least one embodiment, the X parameters may further include a target password. The determination of the M WI-FI connection records from the historical WI-FI connection data at block 203 may include the following operations.

At operation 33, AP information of B surrounding APs of which signal strength values are higher than a preset threshold value is acquired, where B is a positive integer.

At operation 34, Q WI-FI connection records including APs which have ever been successfully accessed are determined from the historical WI-FI connection data, each WI-FI connection record in the Q WI-FI connection records at least including T BSSIDs in the B APs, where T is a positive integer less than or equal to B.

At operation 35, the M WI-FI connection records are selected from the Q WI-FI connection records. SSIDs of the APs which have ever been successfully accessed in each of the M WI-FI connection records are the target SSID and passwords are the target password.

Here, when the target AP is not found by scanning, AP information of other APs may still be obtained, so that the AP information of the B surrounding APs of which the signal strength values are higher than the preset threshold value may be selected from the scanning result, where B is a positive integer. T may be set by the user or may be a system default value. The B APs may include B BSSIDs, the mobile terminal may determine the Q WI-FI connection records including the APs which have ever been successfully accessed from the historical WI-FI connection data, each of the Q WI-FI connection records includes at least T BSSIDs in the B APs (i.e. the at least T BSSIDs in the B BSSIDs), where T is a positive integer less than or equal to B. The M WI-FI connection records are selected from the Q WI-FI connection records, the SSIDs of the APs which have ever been successfully accessed in each of the M WI-FI connection records are the target SSID, and the passwords are the target password.

For example, every time when the user is successfully connected to an AP, a BSSID, encryption scheme and password of the AP and at most M (for example, M=5) surrounding APs of which signal strengths are higher than R (for example, R=−80 db) may be recorded, these surrounding APs (these surrounding APs meeting this condition may be called neighbor information of the AP) form a WI-FI connection record of the AP, and multiple WI-FI connection records may form historical WI-FI connection data, which is stored in a local file. The mobile terminal may, according to currently found AP information, extract M found APs of which signal strengths are higher than R and match the M found APs with the neighbor information the AP stored in historical records. If BSSIDs of the M found APs are equal to BSSIDs of at least N (N<M, for example, N=3) APs in the neighbor information of any AP in the historical records, it is determined that preliminary matching succeeds. AP information in the WI-FI connection records in which encryption schemes and passwords are the same as a second target encryption scheme and a second target password in these successfully preliminarily matched APs in the historical WI-FI connection records may be stored in a list L.

At block 204, H WI-FI connection records are acquired from the M WI-FI connection records, and encryption schemes of the H WI-FI connection records are acquired to get H encryption schemes, where H is a positive integer.

In at least one embodiment, each WI-FI connection record in the H WI-FI connection records includes the target SSID.

At block 205, WI-FI scanning is performed according to the target SSID and the H encryption schemes.

In at least one embodiment, description of operation in block 205 may refer to the corresponding operation in the WI-FI connection method described in FIG. 1, and will not be elaborated herein.

According to the embodiment of the disclosure, the X parameters of the target AP are acquired, the X parameters at least including the target SSID of the target AP, where X is a positive integer; WI-FI scanning is performed according to the X parameters; when the target AP is not found by scanning, the encryption schemes of the hidden APs are acquired from historical WI-FI connection data, to get the H encryption schemes, where H is a positive integer; and WI-FI scanning is performed according to the target SSID and the H encryption schemes. Therefore, the encryption schemes of the hidden APs may be acquired under the condition that a wrong encryption scheme is input, WI-FI scanning is performed according to the target SSID and the encryption schemes of the hidden APs. In this way, connection efficiency of the hidden APs may be improved.

The below is a device for implementing the abovementioned WI-FI connection method, specifically as follows.

Figure 3A:
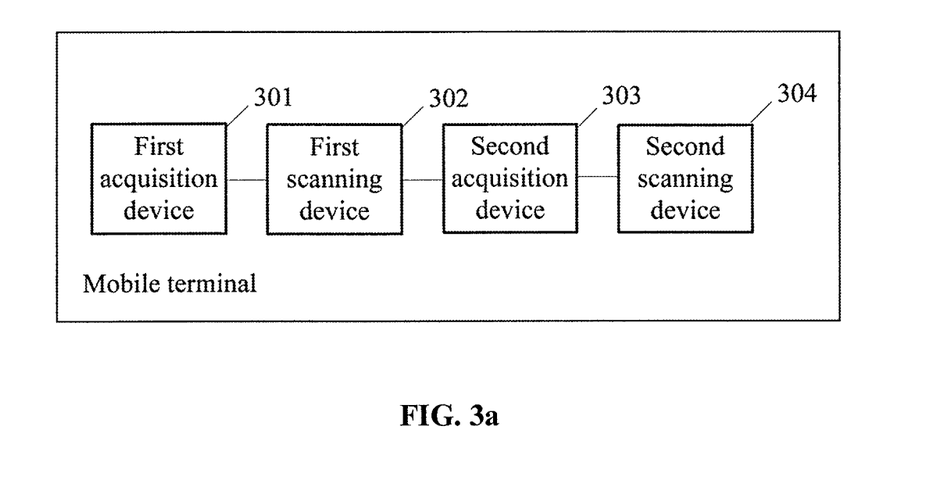
FIG. 3a illustrates a structure diagram of a mobile terminal according to an embodiment of the disclosure.

FIG. 3a illustrates a structure diagram of a mobile terminal according to an embodiment of the disclosure. The mobile terminal described in the embodiment includes: a first acquisition device 301, a first scanning device 302, a second acquisition device 303 and a second scanning device 304, specifically as follows.

The first acquisition device 301 is configured to acquire X parameters of a target AP, the X parameters at least including a target SSID of the target AP, where X is a positive integer.

The first scanning device 302 is configured to perform WI-FI scanning according to the X parameters.

The second acquisition device 303 is configured to, when the target AP is not found by the scanning, acquire encryption schemes of hidden APs to get H encryption schemes, where H is a positive integer.

The second scanning device 304 is configured to perform WI-FI scanning according to the target SSID and the H encryption schemes.

Figure 3B:
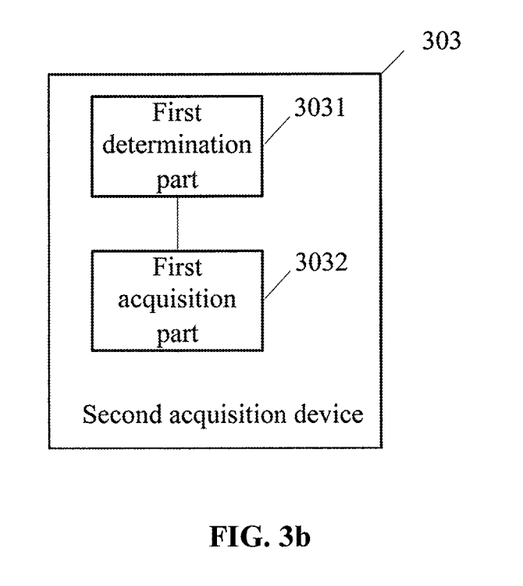
FIG. 3b illustrates a structure diagram of a second acquisition device of a mobile terminal described in FIG. 3a according to an embodiment of the disclosure.

In at least one embodiment, as shown in FIG. 3b, FIG. 3b illustrates a specific detailed structure of the second acquisition device 303 of the mobile terminal described in FIG. 3a. The second acquisition device 303 may include: a first determination part 3031 and a first acquisition part 3032, specifically as follows.

The first determination part 3031 is configured to determine M WI-FI connection records from historical WI-FI connection data, each of the M WI-FI connection records including an AP which has ever been successfully accessed, where M is a positive integer.

The first acquisition part 3032 is configured to acquire H WI-FI connection records from the M WI-FI connection records, and acquire encryption schemes of the H WI-FI connection records.

In at least one embodiment, the first determination part 3031 may include: a second acquisition part (not shown) and a second determination part (not shown), specifically as follows.

The second acquisition part is configured to acquire a current position.

The second determination part is configured to determine the M WI-FI connection records including positions of the mobile terminal in a preset range which is centered at the current position and including the APs which have ever been successfully accessed from the historical WI-FI connection data.

Further, in at least one embodiment, the X parameters further includes a target password; and the first determination part 3031 may include: a second acquisition part (not shown), a third determination part (not shown) and a selector (not shown), specifically as follows.

The second acquisition part is configured to acquire AP information of B surrounding APs of which signal strength values are higher than a preset threshold value, where B is a positive integer.

The third determination part is configured to determine Q WI-FI connection records including APs which have ever been successfully accessed from the historical WI-FI connection data, each of the Q WI-FI connection records at least including T BSSIDs in the B APs, where T is a positive integer less than or equal to B.

The selector is configured to select the M WI-FI connection records from the Q WI-FI connection records, SSIDs of the APs which have ever been successfully accessed in each of the M WI-FI connection records being the target SSID and passwords being the target password.

In at least one embodiment, each of the H WI-FI connection records includes the target SSID.

In at least one embodiment, the second acquisition device 303 is specifically configured to acquire at least one AP with a null SSID from a scanning result, and acquire an encryption scheme of the at least one AP.

In at least one embodiment, the second acquisition device 303 is specifically configured to acquire an AP including the target SSID from the scanning result, and acquire an encryption scheme of the AP.

It can be seen that, according to the mobile terminal described in the embodiment of the disclosure, the X parameters of the target AP are acquired, the X parameters at least including the target SSID of the target AP, where X is a positive integer; WI-FI scanning is performed according to the X parameters; when the target AP is not found by the scanning, the encryption schemes of the hidden APs are acquired to get the H encryption schemes, where H is a positive integer; and WI-FI scanning is performed according to the target SSID and the H encryption schemes. Therefore, the encryption schemes of the hidden APs may be acquired under the condition that a wrong encryption scheme is input, WI-FI scanning is performed according to the target SSID and the encryption schemes of the hidden APs. In this way, connection efficiency of the hidden APs may be improved.

Figure 4:
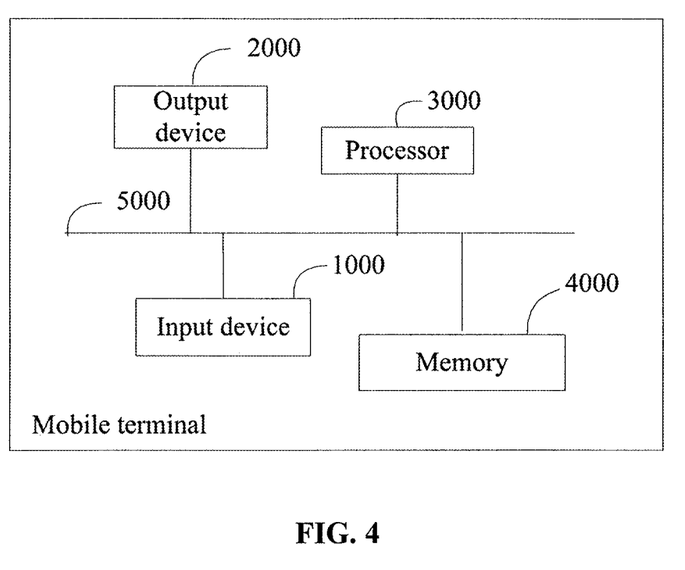
FIG. 4 illustrates a structure diagram of a mobile terminal according to an embodiment of the disclosure.

FIG. 4 illustrates a structure diagram of a mobile terminal according to an embodiment of the disclosure. The mobile terminal described in the embodiment includes: at least one input device 1000, at least one output device 2000, at least one processor 3000, such as a Central Processing Unit (CPU), and a memory 4000. The input device 1000, the output device 2000, the processor 3000 and the memory 4000 may be connected through a bus 5000.

The input device 1000 may specifically be a touch panel, a physical button or a mouse.

The output device 2000 may specifically be a display screen.

The memory 4000 may be a high-speed Random Access Memory (RAM), and may also be a non-volatile memory, such as a disk memory. The memory 4000 is configured to store a set of program codes, and the input device 1000, the output device 2000 and the processor 3000 are configured to call the program codes stored in the memory 4000 to execute the following operations.

The processor 3000 is configured to: acquire X parameters of a target AP, the X parameters at least including a target SSID of the target AP, where X is a positive integer; perform WI-FI scanning according to the X parameters; when the target AP is not found by the scanning, acquire encryption schemes of hidden APs to get H encryption schemes, where H is a positive integer; and perform WI-FI scanning according to the target SSID and the H encryption schemes.

In at least one embodiment, the operation that the processor 3000 acquires the encryption schemes of the hidden APs includes that: M WI-FI connection records are determined from historical WI-FI connection data, each of the M WI-FI connection records including an AP which has ever been successfully accessed, where M is a positive integer; H WI-FI connection records are acquired from the M WI-FI connection records, and encryption schemes of the H WI-FI connection records are acquired.

In at least one embodiment, the operation that the processor 3000 determines the M WI-FI connection records from the historical WI-FI connection data includes that: a current position is acquired; and the M WI-FI connection records including positions of a mobile terminal in a preset range which is centered at the current position and including the APs which have ever been successfully accessed are determined from the historical WI-FI connection data.

In at least one embodiment, the X parameters further include a target password; and the operation that the processor 3000 determines the M WI-FI connection records from the historical WI-FI connection data includes that: AP information of B surrounding APs of which signal strength values are higher than a preset threshold value is acquired, where B is a positive integer; Q WI-FI connection records including APs which have ever been successfully accessed are determined from the historical WI-FI connection data, each of the Q WI-FI connection records at least including T BSSIDs in the B APs, where T is a positive integer less than or equal to B; and the M WI-FI connection records are selected from the Q WI-FI connection records, SSIDs of the APs which have ever been successfully accessed in each of the M WI-FI connection records being the target SSID and passwords being the target password.

In at least one embodiment, each WI-FI connection record in the H WI-FI connection records includes the target SSID.

In at least one embodiment, the operation that the processor 3000 acquires the encryption schemes of the hidden APs includes that AP information of at least one AP with a null SSID is acquired, and an encryption scheme of the at least one AP is acquired.

In at least one embodiment, the operation that the processor 3000 acquires the encryption schemes of the hidden APs includes that an AP including the target SSID is acquired from a scanning result, and an encryption scheme of the AP is acquired.

An embodiment of the disclosure further provides a computer storage medium, wherein the computer storage medium may store a program, and when the program is executed, part or all of operations of any WI-FI connection method recorded in the abovementioned method embodiments are included.

Although the disclosure is described herein in connection with each embodiment, those skilled in the art may understand and implement other variations of the disclosed embodiments by viewing the drawings, the disclosed contents and the appended claims in a process of implementing the invention required to be protected. In the claims, "comprising" does not exclude other parts or operations, and "a" or "one" does not exclude a multiple condition. A single processor or another unit may realize a plurality of functions listed in the claims. Some measures are recorded in different claims, but it does not mean that these measures cannot be combined to achieve good effects.

Those skilled in the art should know that the embodiment of the disclosure may be provided as a method, a device (equipment) or a computer program product. Therefore, the disclosure may adopt a form of pure hardware embodiment, pure software embodiment or combined software and hardware embodiment. Moreover, the disclosure may adopt a form of computer program product implemented on one or more computer-available storage media (including, but not limited to, a disk memory, a Compact Disc Read-Only Memory (CD-ROM) and an optical memory) including computer-available program codes. The computer program is stored/distributed in a proper medium and is provided together with other hardware or serves as a part of the hardware, and may also be distributed in another form, for example, through the Internet or another wired or wireless telecommunication system.

The invention is described in connection with flowcharts and/or block diagrams of the method, device (equipment) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operations are executed on the computer or the other programmable data processing device to generate processing implemented by the computer, and operations for realizing the function specified in one flow or many flows in the flowcharts and/or one block or many blocks in the block diagrams are provided by the instructions executed on the computer or the other programmable data processing device.

Although the invention is described in connection with specific characteristics and the embodiments, obviously, various modifications and combinations may be made to the invention without departing from the spirit and scope of the invention. Correspondingly, the specification and the drawings are only exemplary descriptions about the invention defined by the appended claims, and are considered to cover any and all modifications, variations, combinations or equivalents in the scope of the invention. Obviously, those skilled in the art may make various modifications and variations to the invention without departing from the spirit and scope of the invention. Therefore, if these modifications and variations of the invention belong to the scope of the claims of the invention and equivalent technologies thereof, the invention is also intended to include these modifications and variations.

The invention claimed is:

1. A Wireless Fidelity (WI-FI) scanning method for efficiently connecting to hidden access points, applied to a mobile terminal, the method comprising:
acquiring X parameters of a target Access Point (AP), the X parameters at least comprising a target Service Set Identifier (SSID) of the target AP and an input encryption scheme, where X is a positive integer;
performing first WI-FI scanning according to the X parameters;
when the target AP is not found by the first WI-FI scanning due to the input encryption scheme being wrong, acquiring encryption schemes of one or more hidden APs to get H encryption schemes of the hidden APs, where H is a positive integer; and
performing second WI-FI scanning according to the target SSID and at least one of the H encryption schemes;
wherein the acquiring encryption schemes of one or more hidden APs comprises:
determining M WI-FI connection records from historical WI-FI connection data, each of the M WI-FI connection records comprising information of an AP which has ever been successfully accessed, where M is a positive integer; and
acquiring H WI-FI connection records from the M WI-FI connection records, and acquiring the encryption schemes of the H WI-FI connection records;
wherein the determining M WI-FI connection records from historical WI-FI connection data comprises:
acquiring a current position; and determining, from the historical WI-FI connection data, the M WI-FI connection records comprising positions of the mobile terminal in a preset range which is centered at the current position and comprising the information of the APs which have ever been successfully accessed.

2. The method according to claim 1, wherein the determining M WI-FI connection records from historical WI-FI connection data comprises: acquiring information of B surrounding APs of which signal strength values are higher than a preset threshold value, where B is a positive integer;
determining, from the historical WI-FI connection data, Q WI-FI connection records comprising information of APs which have ever been successfully accessed, each of the Q WI-FI connection records at least comprising Basic SSIDs (BSSIDs) of T APs in the B APs, where T is a positive integer less than or equal to B; and
selecting the M WI-FI connection records from the Q WI-FI connection records, SSIDs of the APs which have ever been successfully accessed in each of the M WI-FI connection records being the target SSID.

3. The method according to claim 1, wherein each of the M WI-FI connection records comprises the target SSID.

4. The method according to claim 1, wherein the acquiring encryption schemes of one or more hidden APs comprises: acquiring at least one AP with a null SSID from a scanning result, and acquiring an encryption scheme of the at least one AP.

5. The method according to claim 1, wherein the acquiring encryption schemes of one or more hidden APs comprises: acquiring an AP comprising the target SSID from the scanning result, and acquiring an encryption scheme of the AP.

6. The method according to claim 1, wherein the X parameters further comprise a target password, and wherein the performing WI-FI scanning according to the target SSID and at least one of the H encryption schemes comprises: performing WI-FI scanning according to the target SSID, the target password and the at least one of the H encryption schemes.

7. A mobile terminal for efficiently connecting to hidden access points, comprising: a processor; and
a memory,
wherein the processor calls codes or instructions in the memory to execute a Wireless Fidelity (WI-FI) scanning method, the method comprising:
acquiring X parameters of a target Access Point (AP), the X parameters at least comprising a target Service Set Identifier (SSID) of the target AP and an input encryption scheme, where X is a positive integer;
performing first Wireless Fidelity (WI-FI) scanning according to the X parameters;
when the target AP is not found by the first WI-FI scanning due to the input encryption scheme being wrong, acquiring encryption schemes of one or more hidden APs to get H encryption schemes of the hidden APs, where H is a positive integer; and
performing second WI-FI scanning according to the target SSID and at least one of the H encryption schemes;
wherein the acquiring encryption schemes of one or more hidden APs comprises:
determining M WI-FI connection records from historical WI-FI connection data, each of the M WI-FI connection records comprising information of an AP which has ever been successfully accessed, where M is a positive integer; and
acquiring H WI-FI connection records from the M WI-FI connection records, and acquire the encryption schemes of the H WI-FI connection records;
wherein the determining M WI-FI connection records from historical WI-FI connection data comprises:
acquiring a current position; and
determining, from the historical WI-FI connection data, the M WI-FI connection records comprising positions of the mobile terminal in a preset range which is centered at the current position and comprising the information of the APs which have ever been successfully accessed.

8. The mobile terminal according to claim 7, wherein the determining M WI-FI connection records from historical WI-FI connection data comprises:
acquiring information of B surrounding APs of which signal strength values are higher than a preset threshold value, where B is a positive integer;
determining Q WI-FI connection records comprising information of APs which have ever been successfully accessed from the historical WI-FI connection data, each Wi-Fi connection record in the Q WI-FI connection records at least comprising Basic SSIDs (BSSIDs) of T APs in the B APs, where T is a positive integer less than or equal to B; and
selecting the M WI-FI connection records from the Q WI-FI connection records, SSIDs of the APs which have ever been successfully accessed in each of the M Wi-Fi connection records being the target SSID.

9. The mobile terminal according to claim 7, wherein each of the M WI-FI connection records comprises the target SSID.

10. The mobile terminal according to claim 7, wherein the acquiring encryption schemes of one or more hidden APs comprises:
acquiring at least one AP with a null SSID from a scanning result, and acquiring an encryption scheme of the at least one AP.

11. The mobile terminal according to claim 7, wherein the acquiring encryption schemes of one or more hidden APs comprises: acquiring an AP comprising the target SSID from the scanning result, and acquiring an encryption scheme of the AP.

12. The mobile terminal according to claim 7, wherein the X parameters further comprise a target password, and
wherein the performing WI-FI scanning according to the target SSID and at least one of the H encryption schemes comprises:
performing WI-FI scanning according to the target SSID, the target password and the at least one of the H encryption schemes.

13. A non-transitory computer readable storage medium for efficiently connecting to hidden access points, storing instructions, which, when executed by a processor, cause the processor to execute a Wireless Fidelity (WI-FI) scanning method, the method comprising:
acquiring X parameters of a target Access Point (AP), the X parameters at least comprising a target Service Set Identifier (SSID) of the target AP and an input encryption scheme, where X is a positive integer;
performing first Wireless Fidelity (WI-FI) scanning according to the X parameters;
when the target AP is not found by the first WI-FI scanning due to the input encryption scheme being wrong, acquiring encryption schemes of one or more hidden APs to get H encryption schemes of the hidden APs, where H is a positive integer; and
performing second WI-FI scanning according to the target SSID and at least one of the H encryption schemes;
wherein the acquiring encryption schemes of one or more hidden APs comprises:
determining M WI-FI connection records from historical WI-FI connection data, each of the M WI-FI connection records comprising information of an AP which has ever been successfully accessed, where M is a positive integer; and
acquiring H WI-FI connection records from the M WI-FI connection records, and acquiring the encryption schemes of the H WI-FI connection records;
wherein the determining M WI-FI connection records from historical WI-FI connection data comprises:
acquiring a current position; and determining, from the historical WI-FI connection data, the M WI-FI connection records comprising positions of the mobile terminal in a preset range which is centered at the current position and comprising the information of the APs which have ever been successfully accessed.

14. The method according to claim 2,
wherein the historical Wi-Fi connection data comprises multiple WI-FI connection records, and
each WI-FI connection record comprises attribute information of an AP which has ever been successfully accessed and network environment information comprising attribute information of surrounding APs, and
the attribute information of each of the AP and the surrounding APs comprises at least one of: an SSID, a BSSID, an encryption scheme, a password, or whether the AP is hidden or non-hidden.

15. The method according to claim 14, wherein the surrounding APs comprise multiple surrounding APs of which signal strength values are higher than a signal strength preset threshold value.

16. The mobile terminal according to claim 8, wherein the historical WI-FI connection data comprises multiple WI-FI connection records, and each WI-FI connection record comprises attribute information of an AP which has ever been successfully accessed and network environment information comprising attribute information of surrounding APs, and
the attribute information of each of the AP and the surrounding APs comprises at least one of: an SSID, a BSSID, an encryption scheme, a password, or whether the AP is hidden or non-hidden.

* * * * *

UNITED STATES PATENT AND TRADEMARK OFFICE
CERTIFICATE OF CORRECTION

Page 1 of 1

PATENT NO. : 10,728,223 B2
APPLICATION NO. : 15/793323
DATED : July 28, 2020
INVENTOR(S) : Yi Yu et al.

It is certified that error appears in the above-identified patent and that said Letters Patent is hereby corrected as shown below:

On the Title Page

Item (73) Assignee:
"GUANGDONG OPPO MOBILE TELECOMMUNICATIONS CORP., LTD., Dongguan (CN)"

Should read:
--GUANGDONG OPPO MOBILE TELECOMMUNICATIONS CORP., LTD., Dongguan, Guangdong (CN)--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*